United States Patent

[11] 3,581,556

[72] Inventors Richard J. Salvinski
 Hacienda Heights;
 Owen O. Fiet, Redondo Beach, both of, Calif.
[21] Appl. No. 802,403
[22] Filed Feb. 26, 1969
[45] Patented June 1, 1971
[73] Assignee TRW Inc.
 Redondo Beach, Calif.

[54] DENSITY MEASURING INSTRUMENT
 4 Claims, 4 Drawing Figs.
[52] U.S. Cl. .................................................. 73/30,
 73/453, 73/194M, 73/516
[51] Int. Cl. ............................................... G01n 9/20,
 G01n 11/10, G01p 15/02
[50] Field of Search ............................................. 73/194, 194
 E, 194 M, 576, 517, 30, 452, 453; 308/6; 310/166;
 324/151; 317/123

[56] References Cited
UNITED STATES PATENTS
2,916,279 12/1959 Stanton .................... 73/517
2,981,111 4/1961 McIlwrath ................ 73/453
2,992,561 7/1961 Burt ........................ 73/453
3,080,761 3/1963 Speen ...................... 73/516
3,154,950 11/1964 Hargens .................. 73/453
3,221,563 12/1965 Wing ....................... 73/516
3,370,205 2/1968 Dukes ..................... 308/10
3,411,838 11/1968 Atkinson ................. 308/10

Primary Examiner—Richard C. Queisser
Assistant Examiner—C. E. Snee, III
Attorneys—Daniel T. Anderson, Gerald Singer and Alfons Valukonis ABSTRACT: A high precision instrument or gauge is provided for measuring the density of a gas. The gauge includes a buoyant sensing member and forms an active portion of an electric feedback circuit.

The circuit includes an AC (alternating current) bridge the output voltage of which is representative of a deviation of the sensing member from a null position. The bridge output voltage is used to control a restoring force current or electric field used to restore the sensing member to its null position. The feedback voltage or current is a measure of the buoyant force or density of the gas.

The gauge, in one of its preferred embodiments, includes a hollow, magnetic, current conducting sphere which is buoyant when placed in a gas or gaseous mixture whose density is to be measured. The sensing member is magnetically suspended within the field of a differential electromagnet. The position of the sensing member within the magnetic field may be adjusted by changing the current to the electromagnet coils. Similarly, if the disturbance causes the sensing member to move from a null position, an appropriate change in the coil current will restore the sensing member to the null position. The coil current is controlled by the servosystem feedback voltage.

Owen O. Fiet
Richard J. Salvinski
INVENTOR

BY William B. Leach
ATTORNEY

Owen O. Fiet
Richard J. Salvinski
INVENTORS

BY William B Leach
ATTORNEY

DENSITY MEASURING INSTRUMENT

BACKGROUND OF THE INVENTION

The invention described herein was made in the performance of work under a NASA contract and is subject to the provisions of Section 305 of the National Aeronautics and Space Act of 1958, Public Law 85—568, Public Law 85—568 (72 Stat. 435; 42 U.S.C. 2457).

The field of art to which the invention pertains is fluid density sensing instruments of the type wherein an electrical quantity provides an analog of the measured density.

Present electromechanical density transducers and systems generally are not capable of measurement with a sensitivity of one part in $10^7$. Such systems and instruments therefore have limited usefulness in high precision applications such as measuring low densities of gases in a vacuum, measuring the leakage rate of a gas or liquid in the range of $10^{111}$ grams per second, and calibrating other types of density or leakage measuring instruments.

Although some prior art density measuring systems produce an electrical quantity as an analog of the measured density, most such systems operate in an open loop electrical configuration. The use of a closed loop electrical feedback system inherently eliminates certain environmental error, and enables high sensitivity measurement and dynamic response. However, such a circuit cannot account for the error introduced by absorption. The electrical circuit disclosed herein is particularly suitable for use with the density measuring instrument which forms the subject matter of this invention.

Some prior art density measuring instruments have used closed loop electrical circuits. These instruments have not, however, been directed to applications involving the high precision measurements made possible by the density gauge of the present invention. For example, the means of the present invention for suspending the buoyant member of a null position provides a relatively stiff spring constant. This pring stiffness leads to high response time capabilities. A buoyant member suspended intermediate to only two magnetic poles of opposite polarity provides a soft spring constant. When a disturbing force causes the sensing member to deviate from its null position the member is inherently unstable. It tends to deviate further. The tolerances involved in prior art applications, such as those relating to altitude measurements, were not so critical as one would find in making leakage measurements in the range of $10^{111}$ grams per second.

The high precision density measuring instrument of the present invention may be utilized as a calibration unit or as a standard for other instruments. Such a calibration unit should be capable of making a precise substitution of an electrical quantity for the density of the fluid and be directly traceable to standards established by the United States National Bureau of Standards. In other words, the measurement should be directly traceable to mass, force, length or time.

It is accordingly an object of the present invention to provide an instrument capable of measuring fluid density with high precision.

Another object of the present invention is to provide a precision instrument capable of substituting an electrical quantity as an analog of the fluid density.

A further object of the present invention is to provide a density measuring instrument which is substantially insensitive to the environment.

Yet another object of the present invention is to provide a precision density measuring instrument which provides means for compensating for the effect of adsorption.

Still another object of the present invention is to provide a precision density measuring instrument which provides a measurement which is directly traceable to standards set by the National Bureau of Standards.

Still a further object of the present invention is to provide a precision density measuring instrument which will have an accuracy of better than one part in $10^7$ when used with a closed loop electro servosystem of the type disclosed herein.

SUMMARY OF THE INVENTION

A precision instrument is provided for the measurement of buoyant forces in a gaseous environment. The instrument forms a portion of an electric feedback servosystem. It comprises a sensing member to be subjected to the gas whose density is of interest. The sensing member may be spherical and is buoyant when subjected to the gas in question. A housing for containing the sensing member in an interior chamber is provided and is designed to admit the gas of interest to the interior chamber. The sensing member is suspended within the housing chamber at a preselected null position. The suspension mechanism is of a type which allows the sensing member freedom to deviate from its null position.

Also, position sensing means is provided to monitor the position of the sensing member with respect to its null position. Finally, means for impressing a restoring force is provided. The restoring force urges the sensing member toward its null position.

Through assistance of an electric feedback circuit, the sensing member may be maintained very near its null position. The sensing member deviation from its null position, due to buoyant forces, is represented by an electric error signal and is the output of a bridge circuit. This error signal is amplified many times. The amplified error signal is proportional to the buoyant force and may be recorded or displayed. It is also used to control an electrical quantity such as current or field potential to impress a restoring force on the sensing member.

Most sources of error such as temperature effects are inherently eliminated by the present invention. For very precision work, the effect of adsorption must be taken into account. Therefore, compensator means is provided for measuring the effect of adsorption. The output of the compensator means may be used to electrically cancel the effects thereof.

The foregoing and other objects of the present invention will be understood when taken in conjunction with the following description and accompanying drawings, throughout which like characters indicate like parts and which drawings form a part of this application.

DESCRIPTION OF THE PREFERRED EMBODIMENTS

Figure 1:
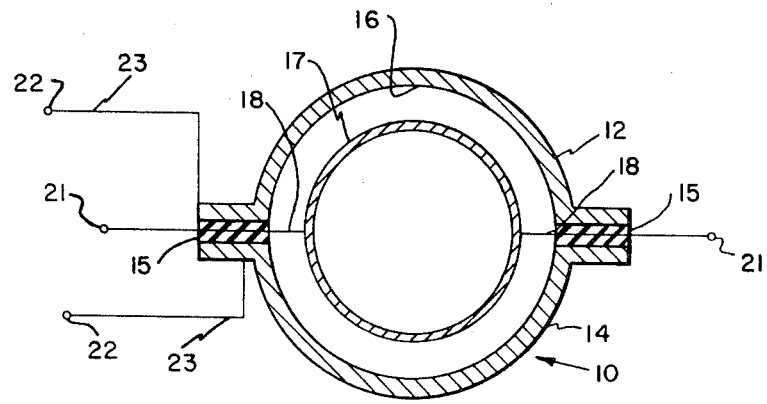
FIG. 1 is a view in cross section of an instrument embodying the features of the present invention.

Referring now to the drawings and particularly to FIG. 1, there is illustrated a density measuring instrument or gauge embodying the present invention. The density transducer or instrument, generally designated 10, includes a housing formed by an upper hemispherical section 12 and a lower hemispherical section 14. Each hemispherical section 12, 14 is of like material and is current conducting. Each section 12, 14 is insulated and separated from one another by insulation material 15. The width of the insulation zone is not critical. The sections 12, 14, when joined together, form a housing having an interior chamber 16. Sphere 17 serves as the buoyancy sensing member and may be suspended within chamber 16 by fine wires 18, 18. These wires are secured to the sphere 17 and are anchored within insulation material 15. The sphere 17 is preferably suspended by at least three fine wires attached at equal intervals to the equatorial horizontal plane of the sensing member. This suspension serves to maintain the sphere at the approximate center or null position within chamber 16. Although omitted from FIG. 1 for purposes of simplicity and clarity, the housing has formed therein at least one port for the ingress and egress of the gas whose density is to be measured.

The sensing member 17 may be made to have electrical conducting properties and the wires may be current conducting with external connections at 21. Also, electrical connectors 22, 22 and conductors 23, 23 may be provided for each of the sections 12, 14 since these sections are also electrical conductors. It then follows that the housing sections 12, 14 may be used as the stationary plates of a capacitor while the sphere 17 constitutes a movable plate. Clearly then, the position of the moving plate or sensing member 17 may be monitored as by a bridge circuit.

Figure 2:
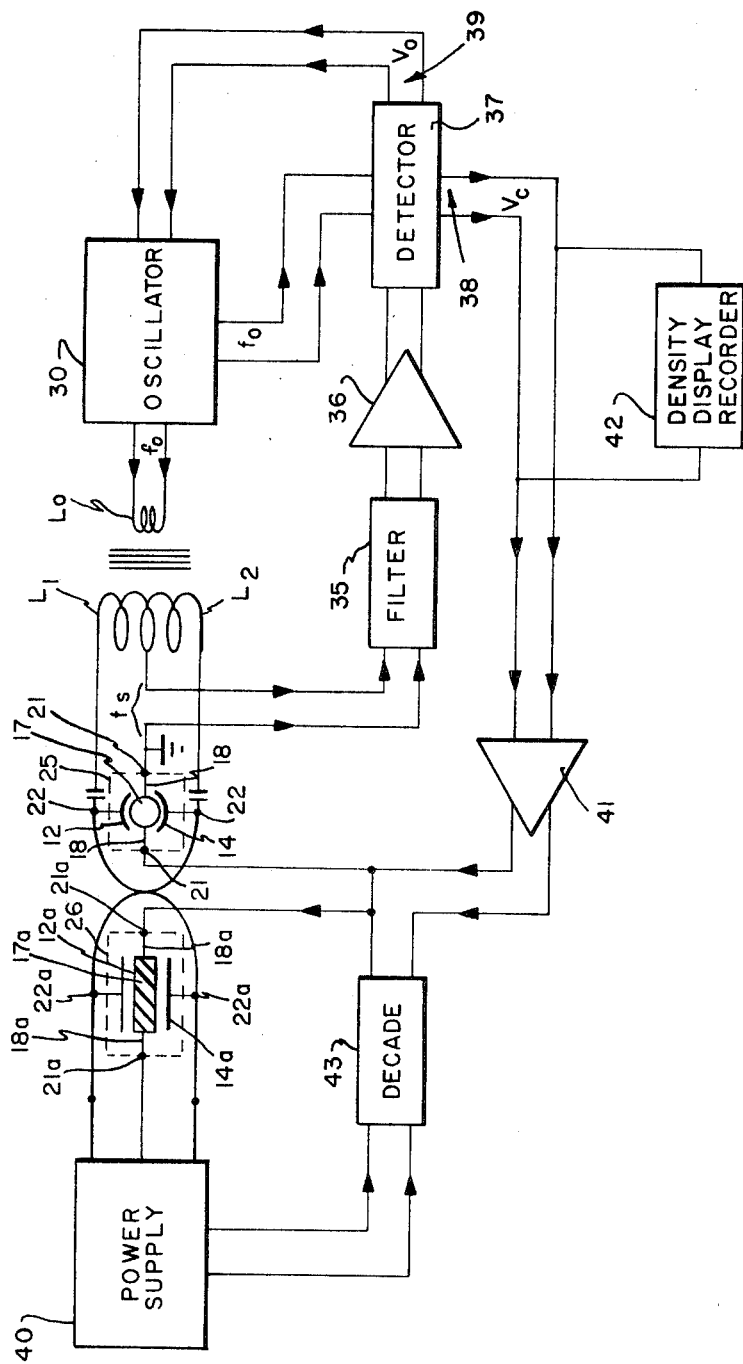
FIG. 2 schematically illustrates a block diagram of an electric feedback circuit employing the instrument of FIG. 1, the circuit being disclosed and claimed in copending application Ser. No. 766,261.

A discussion of the operation of the gauge in the circuit of FIG. 2 is set forth below. Since that circuit includes a means for compensating for the effects of adsorption, a discussion of that compensator will be injected at this point. Adsorption as applied to the instrument of FIG. 1 involves the adhesion in an extremely thin layer of the molecules of the gas under study to the surfaces of the sphere 17. The physical effect of adsorption is to change the tare mass of the buoyant sphere with either an addition or loss of material from its surface. The adsorption process is dependent upon the species of gas being tested, the material from which the sphere 17 is constructed, the temperature of the environment, the partial pressure of the gas being tested, and the molecular bond of the gas. The effect of adsorption begins to take on importance when the buoyant force is in the order of magnitude of $10^{16}$ torr. As the buoyant force being measured becomes less the adsorption effect takes on greater importance.

The change in tare weight due to adsorption of material on the surface of the sphere sensor may be directly compensated by a tare weight sensor whose output may be directly and differentially connected to the output of the instrument of FIG. 1. The tare weight sensor or compensator may be identical to the instrument of FIG. 1 with the exception that the buoyant sphere is replaced by a compensator member which has identical surface quality, material, weight, and total material volume as the spherical sensing member 17 of FIG. 1. The compensator member, however, only has buoyancy equal to the solid material in the buoyant member 17. The compensator member may be a hemisphere having a diameter equal to the sphere 17 of FIG. 1, but having a wall thickness twice that of sphere 17. Both the sensing member 17 and the compensator sensor are exposed to a like environment of the gas to be tested. Both members are therefore subject to the same temperature, pressure, and other environmental factors including the effects of adsorption. Any change in tare weight due to sorption will cause the compensator sensor to deviate from the null position. This change may be sensed as an output of a variable capacitor formed by the compensator hemispherical housing portions and the compensator sensor. Therefore, the output of the instrument of FIG. 1 and the output of the compensator may be electrically connected to cancel the effects of adsorption.

Turning now to FIG. 2, the operation of the instrument of FIG. 1 and the compensator discussed above will be described in terms of the electric feedback circuit. The density sensing instrument 10 of FIG. 1 is shown within the dashed lines 25 and the compensator within dash line 26. The instrument is shown in diagram form and includes the spherical sensing member 17 suspended by wires 18, 18 which terminate at connectors 21, 21. It will be recalled that the hemispherical housing sections 12, 14 (FIG. 1) also serve as capacitor plates and are shown at 12, 14 (FIG. 2) and become a part of the external circuit at connections 22, 22.

As heretofore explained, the tare weight or adsorption compensator is similar in construction to the sensing instrument of FIG. 1. As shown in FIG. 2, the compensator includes a compensator member 17a having identical weight, material, surface quality, and total material volume as the spherical sensing member 17 of the sensing instrument 10. Compensator member 17a, however, has minimal displacement volume and therefore has essentially no buoyancy. It is suspended by fine wires 18a which terminate at connectors 21a. The compensating means further includes stationary capacitor plates 12a and 14a having exterior electrical connections 22a, 22a. As heretofore stated, both the sensing member 17 and the compensator member 17a are subjected to identical samples of the gas whose density is to be measured. Due to the common physical properties of the compensator and sensing members any effect of adsorption thereon will be identical. Any change in position of either member due to change in weight arising from sorption effects will be identical. Thus, the capacitive output of the two devices due to sorption may be used to cancel one another. As shown in FIG. 2, the upper capacitor plate terminal 22a of the compensator is joined by an electrical conductor to the lower capacitor terminal 22 of instrument 10. Also, the lower capacitor terminal 22a of the compensator is joined by an electrical conductor to the upper capacitor terminal 22 of instrument 10.

The density sensing instrument and the adsorption compensator may be included as a portion of a bridge circuit. The bridge circuit includes the capacitors formed by the sensing member 17 and hemispherical capacitor plates 12, 14, and further includes inductive coils $L_1$ and $L_2$. An oscillator 30 provides an output $f_0$ through coil $L_0$ and cooperate with coils $L_1$ and $L_2$ to impress upon the bridge circuit an alternating current having a frequency of $f_0$.

The output of the bridge circuit $f_s$ is a signal which is representative of the instantaneous position of the buoyancy sensing member of instrument 10. This output signal is necessarily representative of the buoyancy force created by the gas whose density is to be measured. The output of the bridge circuit $f_s$ is coupled to the input of a narrow band filter 35. This filter aids in decreasing the system noise power as reflected by the formula $P_n \approx A \nabla f$ wherein A represents the noise amplification factor and $\nabla f$ the frequency range. It will be appreciated that a narrow band of frequencies will tend to minimize the total noise power. If the system noise is minimal, a very small signal may be measured or otherwise detected and used. Furthermore, if the magnitude of the signal to be used by the servosystem is very small, then the movement of the sensing member 17 required to produce that signal is correspondingly small. A small movement lends itself to providing a very small response time.

The output of filter 35 is coupled to the input of an AC amplifier 36. The gain of amplifier 36 is preferably very high, such as one million. The amplifier gain is then effectively the limit upon the system resolution. It will hereinafter become clear that the control signal used to produce a restoring force that urges the sensing member 17 toward its null position will be very large for a very small deviation in the sensing member position. Thus, the sensing member 17 may be continually maintained very near its null position. Since there must always be some deviation from the null position to produce the bridge output signal $f_s$ there is inherently an error between the actual buoyancy force and the indicated buoyance force as measured by the servosystem. However, with a gain of one million, there is only an error of one part in a million.

The output of amplifier 36 is coupled to the input of detector 37. Detector 37 operates upon the amplified density signal $f_s$ to produce two DC (direct current) output voltages. One output 38 is a control voltage $V_c$ which is directly proportional to the amplitude of the amplified AC bridge output signal $f_c$. This voltage is used to vary or control the restoring force exerted upon sensing member 17. As shown in FIG. 2, voltage $V_c$ is used to control an electric field impressed upon the sensing member 17. A direct current power supply 40 is coupled to the hemispherical plates 12, 14 of gauge 10 to create a potential field for controlling the position of sensing member 17. This potential field is variable by changes in the bridge output signal as heretofore described. The other output 39 of detector 37 provides a voltage $V_o$. The voltage $V_o$ is representative of the phase difference between the oscillator output $f_o$ and the amplified bridge output $f_s$. Output 39 of detector 37 is coupled to an input of the voltage controlled oscillator 30. In this manner, the oscillator frequency may be varied to produce a bridge output signal having a frequency which will be most efficiently transmitted by filter 35. Thus, a phase-lock loop is provided. This assures operation of the oscillator at a frequency where the amplifier gain and signal to noise ratio are maximum.

A DC power amplifier 41 is provided for the purpose of matching the power level of the amplified density signal to position the restoring transducer portion of the density sensor. As shown, the output signal $f_s$ may be recorded or visually displayed by the recorder 42.

The restoring force on sensing member 17 is applied thereto by variations in the potential field created by power supply 40 which in turn is controlled by the amplified output signal $f_s$. A decade type unit 43 is useful as a means for setting a zero output reading when there is no applied buoyant force. It is also useful as a means for applying a constant potential field to sensing member 17. In this manner, deviations in buoyancy force about a nominal operating force other than zero may be sensed with high accuracy.

It is noted that while a variable potential field is furnished by power supply 40, a variable current source may be substituted therefore if the sensing instrument restoring force mechanism requires such an input. A variable current input is required for alternative embodiments of the density sensing gauge set forth herein below. In those applications, it is recognized that either DC or AC current may be used to control the restoring force. In the latter case, the AC field frequency must be above the mechanical resonant frequency of the sensing member 17 in order to avoid induced vibrations.

The density sensing instrument and servosystem as has been described is particularly useful when the buoyancy force is very small. It will be appreciated that this system may be utilized for measuring mass accumulation and/or leakage rate of fluids which may be fully vaporized in the sensor environment. It is well known that a buoyant force is equal to the product of the density of the gas in question and the volume of the displaced gas. In the density measuring instrument disclosed herein the displaced volume is fixed or determined by the volume of the buoyant member 17 and the buoyant force is determined by direct measurement. The density of the gas may be calculated therefrom. As indicated, it may be desirable to measure the total mass of a gas leaking or escaping across a given boundary. The gas is accumulated in the fixed volume of the sensing instrument. The buoyancy force may then be measured at the beginning and end of the accumulation cycle. The change in mass is then equal to the change in buoyancy force times the product of the ratio of the fixed volume of the sensing instrument chamber to the displacement volume of the sensing member. It further follows that when the force and mass change take place during a given time interval, the average mass leak rate during the time interval may be determined. Thus, either mass accumulation or leakage rate may be determined.

Figure 3:
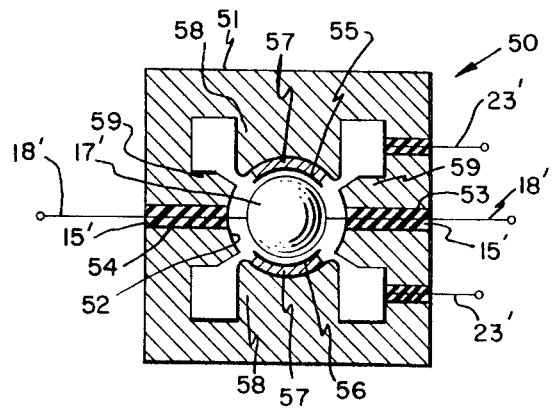
FIG. 3 is an alternative embodiment of an instrument embodying the present invention.

Turning now to FIG. 3 there is shown an alternative embodiment of a density measuring gauge in accordance with the principles of the invention disclosed herein. The instrument, generally designated 50, includes a housing 51 having a cavity 52 formed therein wherein the density sensing member 17' is suspended by fine wires 18'. As was the case with the instrument of FIG. 1, the fine wire 18' extends through and is secured by insulation material 15' which electrically insulates the wire from the housing 51. The insulation 15' is located within and the wire 18' extends through passageways 53, 54 formed through the wall of housing 51. Contrary to the case of FIG. 1, sensing member 17' may be a solid nonconducting material and continuous wire 18' is wrapped several times around an equitoral plane of a sensing member. The sensing member 17' is thereby suspended within cavity 52 of housing 51.

As in the case of the instrument of FIG. 1, the position of the sensing member within the cavity of the housing is determined by capacitive means. Capacitive plates 55, 56 are secured to the interior of the housing but insulated therefrom by insulator 57. Electrical conductors 23', 23' provide external electrical connections from the capacitor plates 55, 56. These capacitor plates are stationary. The fine wire coil 18' wrapped around sensing member 17' serves as a force coil for restoring position. These elements form a portion of the AC bridge circuit as described above in connection with the instrument of FIG. 1.

The sensing member restoring force is provided by electromagnetic means. Housing 51 is a differential magnet having inwardly facing pole faces. Opposing pole faces 58, 58 are of one polarity while the horizontally facing pole faces 59, 59 are of the opposite polarity. A current passing through conductor 18' will induce a reactionary force acting upon the sensing member 17' which may be varied in magnitude by varying the current through wire 18'. Thus, when a buoyant force moves the sensing member 17' from its null position the sensing member may be restored to a point very near its null position. The instrument of FIG. 3 is readily useable in the servosystem of FIG. 2 provided that the variable voltage source 40 is changed to a variable current sources.

Figure 4:
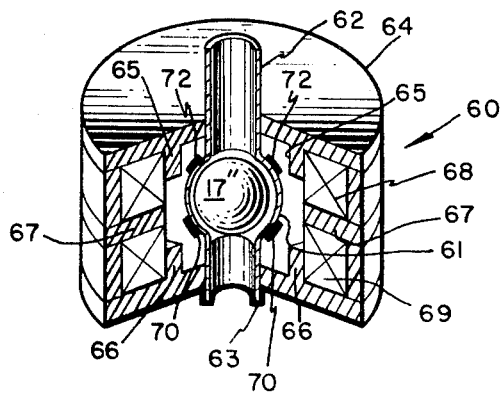
FIG. 4 is another alternative embodiment of an instrument embodying the present invention.

A second alternative embodiment of the invention disclosed herein is shown in FIG. 4. The instrument of FIGS. 1 and 3 require physical means for suspending the sensing member within the housing cavity. The instrument of FIG. 4, generally designated as 60, does not require physical suspension means. A sensing member 17'' is a very thin wall buoyancy sphere which may be constructed by deposition of nickel or other magnetic material. Sensing member 17'' is positioned within a spherical chamber 61 having an inlet passage 62 and an outlet passage 63 through which the gas whose density is to be measured may be admitted and withdrawn. The foregoing structure is mounted within a differential electromagnet 64. The chamber 61 and sensing member 17'' are positioned intermediate the inwardly facing pole faces of the magnet. Pole face 65 is ring shaped and faces a similar ring-shaped pole face 66 of like polarity. The pole face of opposite polarity 67 encircles the sensing member 17''. A return path for the magnetic flux is provided through the wall structure of magnet 64. Electrical coils 68, 69 provide means for inducing magnetic flux through the pole faces. The magnitude of the magnetic field may, of course, be varied by controlling the current passed through the coils 68, 69. Thus, it may be readily understood that the sensing member 17'' may be suspended at a null position within the chamber 61 by adjusting the electric current through the coils 68, 69. Also, if the sensing member 17'' is forced away from its null position, an adjustment in the coil current will restore the sensing member toward its null position.

The position of the sensing member 17'' with respect to its null position may be determined by capacitive means. A first pair of electrodes 70, and a second pair of electrodes 72 may be affixed to the exterior or interior of the chamber wall 61. These electrodes may cooperate to form the plates of a capacitor and may be electrically placed in adjacent legs of the AC bridge circuit of FIG. 2. In other words, the space between the electrodes and the sensing member 17'' constitutes the dielectric which is variable by movement of the sensing member 17''. These capacitive elements become a part of the bridge circuit of FIG. 2. Any change in position of the current conducting sensing member 17'' will be reflected as a change in the capacitance of the respective capacitors.

A buoyancy force measuring instrument and electroservosystem as disclosed herein provides a means for measuring fluid density with high precision without the introduction of error introduced by the environment and which is further insensitive to the effects of adsorption. The measurement provided thereby is traceable to the standards of mass, length and time thereby corresponding to standards set by the National Bureau of Standards.

We claim:

1. An instrument for precision measurement of buoyant forces in a fluid particularly suitable for use with a closed loop feedback circuit in which a signal representative of a sensed deviation is processed to generate an error or feedback signal, the instrument comprising:
   a. A spherical, magnetizable sensing member which is buoyant when placed in the fluid to be analyzed;
   b. a housing having an interior chamber adapted to receive said sensing member therein and having an inlet and outlet port whereby fluid, whose density is to be measured, may be admitted to said housing chamber;
   c. a pair of magnetic poles of like polarity each encircling a portion of one hemisphere of said sensing member;
   d. another magnetic pole, common to each of said pair of magnetic poles, of opposite polarity and encircling said sensing member near its equatorial plane and in a plane transverse to the buoyant forces;
   e. electric coils associated with each of said pair of magnetic poles for defining electromagnetic and magnetic fields intermediate said poles for suspending said sensing member at a null position about which said sensing member may deviate in response to buoyant forces;
   f. forces producing means coupled to the circuit for applying diametrically aligned electromagnetic field forces to said sensing member in response to the error signal, at least one portion of said forces being diametrically applied in alignment with the buoyant forces, and at least another portion of said forces being diametrically applied transversely to the axis of buoyant forces; and
   g. a position sensing means operatively connected to said sensing member and coupled to the electric feedback circuit for producing an electric signal representative of the deviations of said sensing member with respect to its null position whereby the position signal may be processed to generate an error signal to electrically vary the electromagnetic forces, the error signal being directly proportional to the buoyant force acting upon said sensing member.

2. The precision instrument of claim 1 further comprising means associated with said electric coils for varying the current in each of said coils associated with each of said pair of magnetic poles whereby the position of said sensing member may be varied.

3. An instrument for precision measurement of buoyant forces in a fluid particularly suitable for use with a closed loop feedback circuit in which a signal representative of a sensed deviation is processed to generate an error or feedback signal, the instrument comprising:
   a. a spherical electrically conducting sensing member which is buoyant when placed in the fluid to be analyzed;
   b. a pair of hemispherical electrodes encompassing said sensing means and forming a housing having an interior chamber adapted to receive said sensing member therein and having an inlet and outlet port whereby fluid, whose density is to be measured, may be admitted to said housing chamber;
   c. electrical insulation intermediate said hemispherical electrodes;
   d. flexible, electrically conducting threads coupled to said sensing member at points along an equatorial plane for suspending said sensing member within said housing chamber at a null position about which said sensing member may deviate in response to buoyant forces;
   e. force producing means coupled to the circuit and to said conducting threads and said hemispherical electrodes for applying diametrically aligned electrostatic field forces to said sensing member in response to the error signal, at least one portion of said forces being diametrically applied in alignment with the buoyant forces, and at least another portion of said forces being diametrically applied transversely to the axis of buoyant forces; and
   f. a position sensing means operatively connected to said sensing member and coupled to the electric feedback circuit for producing an electric signal representative of the deviations of said sensing member with respect to its null position whereby the position signal may be processed to generate an error signal to electrically vary the electrostatic forces, the error signal being directly proportional to the buoyant force acting upon said sensing member.

4. An instrument for precision measurement of buoyant forces in a fluid particularly suitable for use with a closed loop feedback circuit in which a signal representative of a sensed deviation is processed to generate an error or feedback signal, the instrument comprising:
   a. a spherical sensing member which is buoyant when placed in the fluid to be analyzed;
   b. a housing having an interior chamber adapted to receive said sensing member therein and having an inlet and outlet port whereby fluid, whose density is to be measured, may be admitted to said housing chamber;
   c. flexible, electrically conducting threads coupled to said sensing member at points along an equatorial plane for suspending said sensing member within said housing chamber at a null position about which said sensing member may deviate in response to buoyant forces;
   d. an electrical coil wrapped around the equatorial plane of said sensing member and coupled between said flexible conductors with the coil axis coaxially aligned with the buoyant force;
   e. a first pair of magnetic poles of like polarity positioned above and below said sensing member and having their axis coaxially aligned with the buoyant force;
   f. a second pair of magnetic poles having a polarity opposite to that of said first pair of poles and further having pole faces which substantially encircle said sensing member in a plane transverse to the buoyant force whereby an error signal controlled current may be passed through said flexible threads and coil to form an induced magnetic field which reacts with the field of said magnetic poles to position said sensing member at its null position; and
   g. a position sensing means operatively connected to said sensing member and coupled to the electric feedback circuit for producing an electric signal representative of the deviations of said sensing member with respect to its null position whereby the position signal may be processed to generate an error signal to electrically vary the electromagnetic forces, the error signal being directly proportional to the buoyant force acting upon said sensing member.